US007185939B2

(12) United States Patent
Stark et al.

(10) Patent No.: US 7,185,939 B2
(45) Date of Patent: Mar. 6, 2007

(54) HYDRAULIC DRIVE SYSTEM FOR VEHICLE ROOFS

(75) Inventors: Michael Stark, Neckar (DE); Reiner Hess, Balingen-Ostdorf (DE)

(73) Assignee: Magna Car Top Systems GmbH (DE)

( * ) Notice: Subject to any disclaimer, the term of this patent is extended or adjusted under 35 U.S.C. 154(b) by 0 days.

(21) Appl. No.: 11/355,688

(22) Filed: Feb. 16, 2006

(65) Prior Publication Data

US 2006/0202504 A1 Sep. 14, 2006

Related U.S. Application Data

(63) Continuation of application No. PCT/EP2004/008649, filed on Aug. 2, 2004.

(30) Foreign Application Priority Data

Aug. 19, 2003 (DE) ............................... 103 38 551

(51) Int. Cl.
*B60J 7/057* (2006.01)

(52) U.S. Cl. ...................... 296/107.01; 60/446; 60/476

(58) Field of Classification Search ........... 296/107.01, 296/112, 115, 117; 60/446, 450, 452, 476; 91/392

See application file for complete search history.

(56) References Cited

U.S. PATENT DOCUMENTS 2,952,127 A 9/1960 Parsons
3,613,818 A 10/1971 Schubert et al.
4,643,074 A * 2/1987 Gunda et al. ................. 91/361
5,033,311 A * 7/1991 Custer ...................... 73/861.53
5,063,740 A * 11/1991 Aihara ........................ 60/432
5,666,806 A * 9/1997 Dietz .......................... 60/327
5,778,671 A * 7/1998 Bloomquist et al. .......... 60/456
6,863,334 B2 * 3/2005 Dangl et al. ........... 296/107.09
2003/0005692 A1 1/2003 Mentink et al.
2005/0144939 A1 * 7/2005 Mentink et al. .............. 60/476

FOREIGN PATENT DOCUMENTS

DE 4104805 A 8/1991
DE 10149228 A 5/2003
EP 0546300 A 6/1993

* cited by examiner

*Primary Examiner*—D. Glenn Dayoan
*Assistant Examiner*—Paul Chenevert
(74) *Attorney, Agent, or Firm*—Brooks Kushman P.C.

(57) ABSTRACT

The invention relates to a hydraulic drive system used for the covers of vehicle openings, in particular for vehicle roofs with a construction that can be opened. In said system, the actuator that is designed to displace the cover is supplied with a bulk current, whose target value is determined in accordance with the control path of the actuator, which is in correlation with the controlled displacement of the cover and whose actual value is detected when supplied to the actuator by means of a bulk current sensor. The bulk current is adjusted to compensate for differences between the actual and target values.

6 Claims, 1 Drawing Sheet

HYDRAULIC DRIVE SYSTEM FOR VEHICLE ROOFS

CROSS-REFERENCE TO RELATED APPLICATIONS

This application is a continuation of PCT application Ser. No. PCT/EP2004/008649, filed Aug. 2, 2004.

BACKGROUND OF THE INVENTION

1. Field of the Invention

The invention relates to a hydraulic drive system for vehicle roofs that can be opened.

2. Background Art

A hydraulic drive system for adjustable vehicle roofs is disclosed in German patent application DE 101 49 228 A, in which a rotary drive is associated with the body-side connection of the roof kinematics. This rotary drive includes a hydraulic cylinder actuator. A piston rod of the hydraulic cylinder engages a driving pinion connected in a rotationally fixed manner via associated gearing to the roof kinematics. The actuating path is correlated with the position of the roof or roof part that is adjusted by the roof kinematics. The particular position of the roof or roof part may be detected by a sensor that tracks the actuating path. The instantaneous position of the roof or roof part is detected in an indirect manner along the actuating path. The position of other parts of the rotary drive apparatus makes it possible to determine the exact position of the roof or roof part in each phase of the transport motion of the roof or roof part between the closed and stored position. Adjustment of the roof or roof part, in particular the adjustment speed thereof, may also be influenced by the impingement of the actuator. Fluctuations in speed caused primarily by fluctuations in the coefficient of friction, may appear as a function of factors influencing the smooth running of the system and may remain unaccounted for. In particular, for multipart roof systems having multiple independently driven roof parts, problems may arise due to the narrow tolerances that must be observed in the motion sequence.

Hydraulic systems for motor vehicles are also disclosed in German patent application DE 41 04 805 A1. This application relates to a "hydraulic electrical system," that supplies any given number of systems in the motor vehicle with pressurized media. Examples of such systems include the air pump, water pump, and steering system, which are driven by the internal combustion engine in a common drive train. In addition, a drive connection, which may be separated via a coupling, between the internal combustion engine and a hydraulic pump provides a branched hydraulic circuit containing a gear motor through one of its branched lines. The gear motor used as the drive for an air conditioner compressor and a generator, and through the other branched line provides rapid leveling control, the actuator cylinders of which are connected to this branched line with interconnection of a control module. The pump driven by the internal combustion engine via the coupling is a variable displacement pump. The pump is part of the hydraulic system and is actuated in such a way that the leveling control is operated essentially at constant pressure. In a further exemplary embodiment, the variable displacement pump delivers a fixed volumetric flow when in its open position at the inlet to the gear pump by means of a proportional flow control valve. The purpose of the system is to supply the leveling control on a priority basis if necessary, to achieve an increased charging current for the generator and maximum cooling power of the air conditioner compressor when the internal combustion engine is idling.

A further hydraulic drive system for vehicle roofs that can be opened, in which at least one roof part is to be adjusted by means of an actuator, is disclosed in published patent application US 2003/0005692 A1. The object of this drive system is to achieve an undisturbed motion sequence, corresponding to the design requirements, for such roofs over the adjustment path, i.e., an "ideal" adjustment of the roof. This approach provides for a particular roof position in which the setting actuator, via the pump, is impinged on with a working pressure. The "predetermined" working pressure is based on an ideal motion sequence and corresponds to an "assumed" roof load that corresponds to the ideal motion sequence.

The power of the motor driving the pump and the current flowing through the motor corresponds to the "predetermined" working pressure. Deviations of the "actual" roof load from the "assumed" roof load result when the motion sequence is disturbed. Motion sequence disturbances cause changes in the current flowing through the motor which is detected as a measured variable. When deviations occur, such as an increased roof load compared to the assumed roof load when the roof contacts a stop position, the associated change in pressure is taken into account by modification of the motor power. In the case previously mentioned, the motor power is reduced in order to lower the working pressure impinging on the actuator and thus to decrease the actuating force counteracting the roof load. The motor power is modified depending on the "actual" roof load, as a function of the load.

As an analogy for detecting deviations of the actual working pressure from the "assumed" working pressure based on a roof load, the known approach provides for the use of the quantity of working medium flowing to the return cycle of the hydraulic system as a measured variable. Alternatively, the system may operate with a flow sensor which detects whether flow from the pump to the actuator has occurred. The power of the motor driving the pump is modified as a function of these values, and the working pressure corresponding to the pump capacity is reduced.

SUMMARY OF THE INVENTION

One aspect of the invention is to provide a hydraulic drive system in which the roof and/or the roof parts, both individually and in relation to one another, in their motion sequence follow the specifications almost exactly, i.e., with negligible tolerances.

This is achieved according to the invention wherein the actuator is regulated by control of the volumetric flow. The actual value of the volumetric flow sent to the actuator is detected by a volumetric flow sensor and compared to the volumetric flow specified over the actuating path as a setpoint value. The differential value is processed by a controller in terms of correction of the actual value, and the volumetric flow is thus modified so that the actual value corresponds to the setpoint value.

Volumetric flow control may be achieved in a simple manner and with the use of commercially available units. Tolerances in the motion sequence, dictated by both the mechanical mobility and the hydraulics, for example, as a result of fluctuations in the volumetric capacity of the pump, may be avoided. This corresponds to the provision of a volumetric flow, specified by the volumetric flow control. The volumetric flow control is independent of the particular load to be supported, in this case the roof load, and corresponds to the desired undisturbed motion sequence for the roof.

This may be achieved within the scope of the invention by adjusting the flow capacity of the pump, provided as a volumetric flow source, to the setpoint value by modifying the rotational speed of the pump and/or the pump volume.

Corresponding adjustment of the volumetric flow by means of a proportional value downstream from the pump is also within the scope of the invention. This approach has proven to be particularly advantageous when multiple roof parts are provided and an actuator is associated with each of these roof parts. Coordination of the motion sequences of the roof parts with respect to one another is realized by control of the volumetric flow. Individual impingement of multiple actuators based on control of the volumetric flow may be achieved by use of a common volumetric flow source. The common volumetric flow source is designed as a pump that has proportional valves situated downstream and associated with each of the actuators. The actual flow values, which are measured in the flow to the respective actuator via the particular volumetric flow sensor, are advantageously processed in a controller by storing in an appropriate value the volumetric flow over the actuating path as a setpoint values. For example, characteristic curves or characteristic maps may be stored in the controller, based on the respective number of actuators or the roof parts impinged on by these actuators.

Further particulars and features of the invention will be apparent from the claims. The invention is also explained in greater detail below, with reference to one exemplary embodiment showing a schematic illustration of a hydraulic drive system for a vehicle roof, not shown, having a construction that can be opened, whether in the form of a hardtop with one or more roof parts, or in the form of a soft-top.

DETAILED DESCRIPTION OF THE PREFERRED EMBODIMENT(S)

Figure 1:
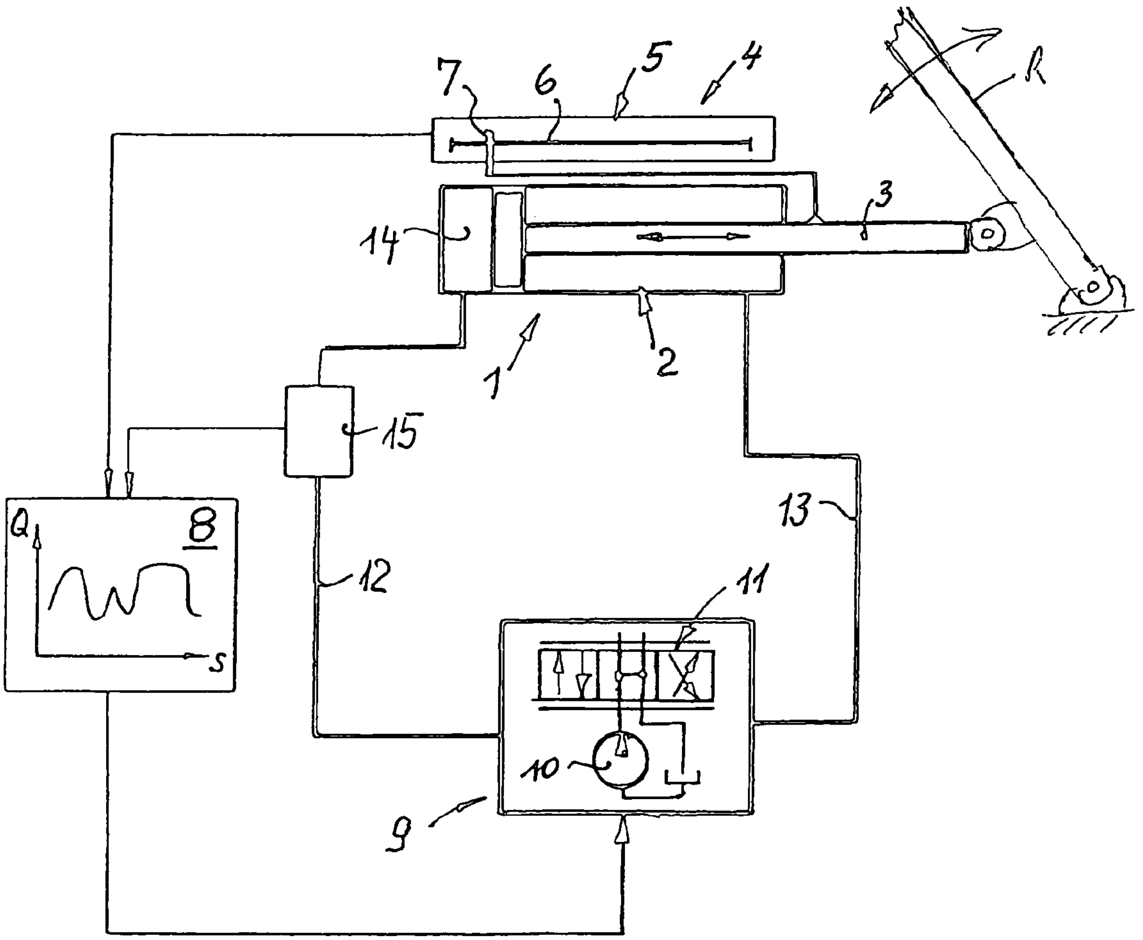
FIG. 1 schematically illustrates an embodiment of the invention.

FIG. 1 shows an actuator, designated by reference numeral 1, designed as a double-acting positioning hydraulic cylinder 2. A piston rod 3 of the hydraulic cylinder 2 is connected, for example, to a pinion in a drive connection (not shown) which is associated in a rotationally fixed manner with a drive rod of a shaft connected to roof kinematics for the roof R. The roof R or roof part supported by the kinematics is adjustable by means of the adjustment motion of the actuator 1. One approach in this regard is shown in DE 101 49 228 A, for example. The actuator 1 may also be provided in the kinematic connection for adjustment of two or more roof parts with respect to one another, or as a drive therebetween.

As a departure from the illustration shown, the actuator 1 may be designed as a rotary actuating drive.

As illustrated, the actuator 1 is in a forced mechanical connection with the roof or roof part to be adjusted. In the exemplary embodiment, a specific position of the roof or roof part is correspondingly associated with the particular position of the roof or roof part connected to the piston rod 3. Thus, the corresponding position of the roof or roof part may be detected by detecting the position of the piston rod 3 with respect to the positioning cylinder 2 or another appropriate fixed point.

In the exemplary embodiment, the position of the actuator over its actuating path, corresponding to the position of the roof or the particular roof part, is detected by means of a measuring system 4 which is symbolically represented by an ohmmeter 5 comprising a coil 6 and a sliding contact element 7 fixedly connected to the piston rod 3. The measuring system 4 is connected to the controller 8, providing means by which the volumetric flow 9 is actuated. The volumetric flow source 9 may be formed, for example, by a hydraulic pump 10 and a three position control valve 11 downstream therefrom, designed as a proportional valve. Depending on the actuation of the control valve 11, the volumetric flow 9 via lines 12 or 13 impinges on the positioning cylinder 2 resulting in the in- and out-motion of the piston rod 3.

In the exemplary embodiment, line 12 opens into the working space 14 of the positioning cylinder 2 defined by the piston rod 3, and a volumetric flow sensor 15 of known design is provided in the line 12. Such volumetric flow sensors are available, for example, from IPM-HYDRAULIK™ Leipzig, and detect the volumetric flow as a variable which is directly proportional to the lift of the actuator. Within the scope of the drive system according to the invention, the variable is sent to the controller 8 as the actual value of the volumetric flow.

The setpoint value of the volumetric flow, which during the motion of the roof corresponds to the desired adjustment speed for the particular roof or roof part, is detected in the controller 8 and is compared to the actual value of the volumetric flow which is measured by the volumetric flow sensor and sent to the controller 8. The volumetric flow source 9 is actuated as a function of the deviation of the actual from the setpoint value. For actuator 1, an impingement corresponding to the predetermined setpoint value is ensured, and the roof or the roof parts which may be adjusted with respect to one another are moved in their relative positions or with respect to the adjacent body parts.

The approach according to the invention allows adjustment speed of the roof or roof parts to be controlled relative to the body, or in their positions with respect to one another. For example, the roof parts may be moved more slowly relative to the end positions and more quickly over adjustment paths situated therebetween. Overall high adjustment speeds for the roof or roof parts may be achieved with adjustment speeds being reduced in safety-relevant locations.

The particular predetermined actuating speed over the respective adjustment path, as indicated, may be stored in the controller 8 as a characteristic curve or in characteristic maps, so that, for corresponding separate drives, a desired precisely positioned actuation is possible for both the roof as a whole and the roof parts of a segmented roof.

In conjunction with a design comprising the pump 10 and proportional valve 11, the volumetric flow source (indicated only in schematic fashion) allows the necessary supply of the particular desired and required volumetric flow to be supplied in a simple manner. In principle, it is also within the scope of the invention to achieve the volumetric flow in the desired manner by controlling the rotational speed of the pump 10, so that provision of the downstream valve as a proportional valve 11 may optionally be omitted.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A hydraulic drive system for a vehicle roof having at least one roof part that may be opened and closed and that may be adjusted via an actuator, the drive system comprising:

a volumetric flow source that is connected to the actuator, wherein the position of the actuator is correlated to the particular position of the roof part over an actuating path, a volumetric flow sensor that detects the position of the roof part by a measuring system, wherein measured signals corresponding to the positions of the roof part are determined by reference to a plurality of set point values, a controller that controls the volumetric flow to the actuator over the actuating path of the actuator, wherein the volumetric flow is specified in terms of the plurality of set point values, and wherein the actual position of the roof part is monitored by the volumetric flow sensor and is provided as an actual value, wherein actual value of the volumetric flow is compared to the volumetric flow specified over the actuating path as the plurality of set point values, wherein a deviation of the actual value from the set point value is controlled to compensate for variations.

2. The hydraulic drive system of claim 1 wherein the deviation is processed by the controller in terms of correction of the actual value and the volumetric flow is modified so that the actual value corresponds to the set point value.

3. The hydraulic drive system according to claim 1 wherein the volumetric flow source is a pump.

4. Hydraulic drive system according to claim 3 wherein the volumetric pumping capacity of the pump may be adjusted by modifying the rotational speed of the pump.

5. Hydraulic drive system according to claim 3 wherein the volumetric pumping capacity of the pump may be adjusted by modifying the pump volume.

6. Hydraulic drive system according to claim 3 further comprising a proportional valve by which the volumetric flow may be adjusted downstream from the pump.

* * * * *